United States Patent [19]
Doncque

[11] 4,094,375
[45] June 13, 1978

[54] RIGID CONNECTION DEVICE AND ITS APPLICATION TO MOTOR CYCLES

[75] Inventor: Pierre M. Doncque, Amiens, France

[73] Assignee: Agence Nationale de Valorisation de la Recherche (ANVAR), Neuilly sur Seine, France

[21] Appl. No.: 670,943

[22] Filed: Mar. 26, 1976

[30] Foreign Application Priority Data

Apr. 3, 1975 France .................................. 75 10461

[51] Int. Cl.² ............................................. B62K 11/04
[52] U.S. Cl. ................................ 180/33 A; 180/33 R; 280/281 R
[58] Field of Search ............................. 180/33 A, 33 R; 280/281

[56] References Cited

U.S. PATENT DOCUMENTS 1,551,094  8/1925  Francis .................................. 280/281
2,720,273  10/1955  Johnson et al. ..................... 180/33 R

FOREIGN PATENT DOCUMENTS 167,411  8/1921  United Kingdom ................. 280/281

Primary Examiner—Joseph F. Peters, Jr.
Assistant Examiner—Donn McGiehan
Attorney, Agent, or Firm—Cushman, Darby & Cushman

[57] ABSTRACT

A rigid connection between a bar and a reference solid, for example for connecting the steering column and engine block of a motor cycle, includes an intermediate solid incorporating the bar and having two connection points in alignment on a transverse line spaced from the bar. A structure of at least five connecting bars connects those transverse connection points and connection points on the bar to at least two connection points of the reference solid which are each connected to at least two connection points of the intermediate solid.

6 Claims, 7 Drawing Figures

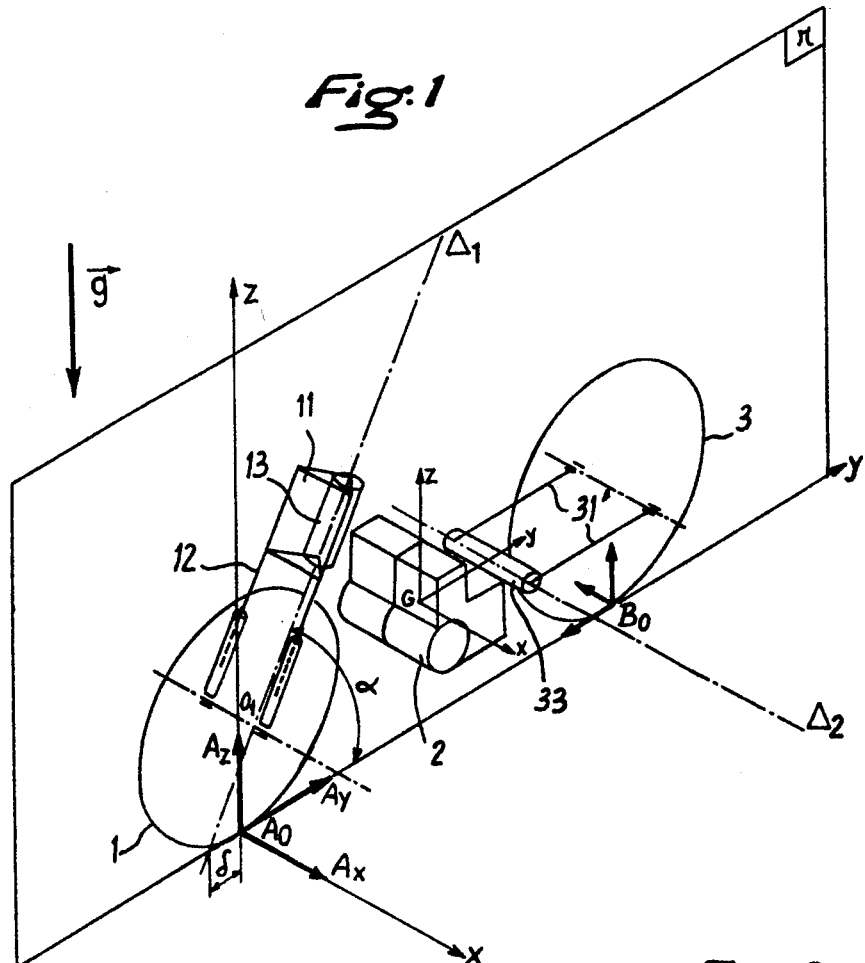

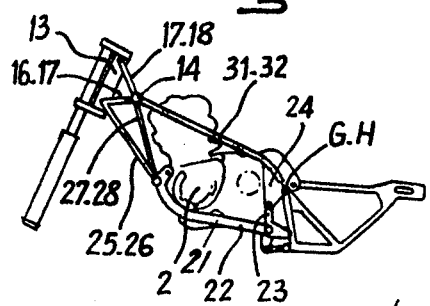
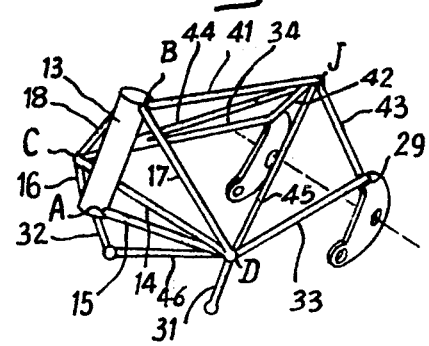
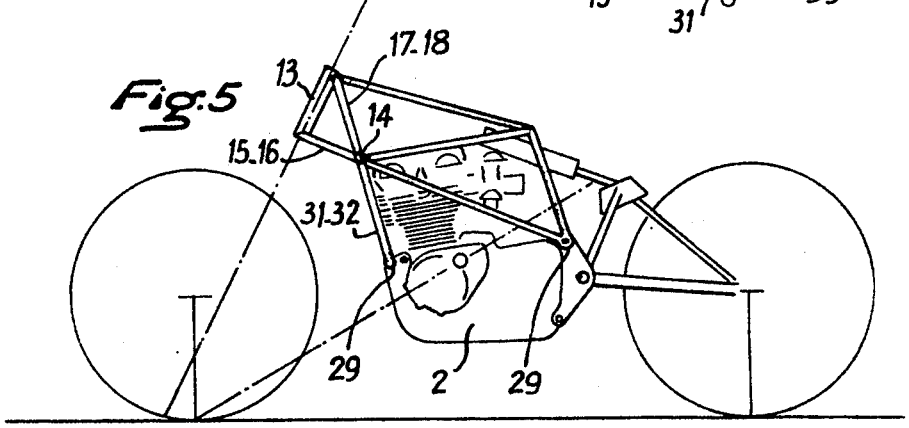
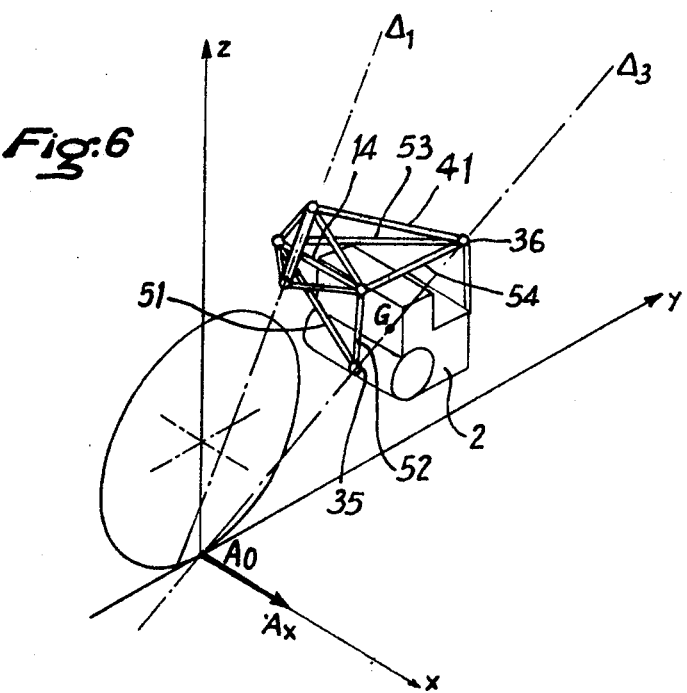

RIGID CONNECTION DEVICE AND ITS APPLICATION TO MOTOR CYCLES

BACKGROUND OF THE INVENTION

1. Field of the Invention

The invention relates to a rigid connection device, which has at most one degree of freedom, and which connects a reference solid and a bar; and to the application of such a device to a motor cycle having a rigid frame and an engine block, the frame including a steering column.

The invention is particularly applicable to motor cycles, but it should be understood that the invention may have other applications.

The application of the invention to two-wheeled vehicles, will be described with reference solely to motor cycles, but it is understood that the invention is applicable to any two-wheeled vehicle, the term motor cycle being used here for simplicity.

The invention is applicable more particularly to high-performance motor cycles in which control of the machine requires the elimination of all low-frequency vibrations which deform elastically the structure connecting the wheels to the engine block.

2. Description of the Prior Art

In United Kingdom Patent Nos. 211,281 and 7,289(1915), motor cycle frames have already been proposed in which each of the conventional front elements is replaced by two straight, divergent tubes to the ends of which two side frames are fixed. British Patent No. 16,693(1915) proposed a structure of tubes having articulated connections.

However motor cycle frames, even those just mentioned, have insufficient torsional rigidity to avoid all risk of low-frequency resonance with variations of forces resulting from external or internal causes. External causes include defects of road surfaces and gusts of wind, while the internal causes include the behaviour of tyres, shock absorbers, and the rider himself, and also the dynamic moments of the wheels and crankshaft.

A main object of the invention is to provide a rigid structure for connecting a reference solid and a bar, and to provide a motor cycle construction in which the motor cycle engine constitutes the reference solid and the steering column constitutes the bar. A motor cycle constructed with a connecting structure according to the invention must be able to withstand more satisfactorily than known motor cycles the torsional forces of the connection between the steering column and the frame by eliminating all low-frequency vibrations effecting elastic deformation.

Another object of the invention is to provide a rigid structure which can be manufactured easily without requiring expensive experimentation or complicated calculations. Yet another object in the case of a motor cycle, is to provide better behaviour in the event of a fall.

SUMMARY

The invention provides a rigid connection device, which has at most one degree of freedom, for connecting a reference solid and a bar, for example the engine block and steering column of a motor cycle. The connection device comprises an intermediate solid rigidly connected to the bar at two connection points and defining two other connection points disposed in alignment on a transverse straight line at a distance from the bar. The intermediate solid is joined to the reference solid by a structure of at least five connecting bars which connect said other connection points of the intermediate solid and at least one other connection point of the intermediate solid at a distance from the alignment of the said two other connection points to at least two connection points of the reference solid, at least two of these connection points of the reference solid each being connected to at least two connection points of the intermediate solid.

For connection of the reference solid without any degree of freedom the reference solid comprises at least three connection points by which it is connected to the connection points of the intermediate solid by at least six connecting bars in such a manner that the connection between the reference solid and the bar has no degree of freedom.

Advantageously the device comprises six connecting bars, so that the assembly comprising the bar, the reference solid, the intermediate solid, and the connecting bars is an isostatic structure.

The intermediate solid may be a rigid box. The box may have openings in its unstressed zones. In a preferred embodiment the intermediate solid is a tetrahedron formed by the bar, a cross-member, and four other connecting bars joining the bar and the cross-member.

It will be seen that the invention provides a connection frame of a new type, in which each connecting bar can be a tube operating as a link. A calculable, homogeneous range of stresses is obtained. There is better control of the dangerous zones of the structure, and therefore improved reliability. Moreover, a great deal of useless material can be eliminated, thus giving a substantial reduction of weight in comparison with conventional structures.

The invention also provides a motor cycle in which the engine, or a cradle holding the engine, and the steering column are joined by a connection device according to the invention in which the lateral connection points of the intermediate solid are in an intermediate position constituting a horizontal cross-member between the connection points of the engine and the axis of the steering column.

It is then advantageous for the length of the cross-member to be substantially equal to the minimum overall space required for the rider's knees.

BRIEF DESCRIPTION OF THE DRAWINGS

Some embodiments of the invention will now be described, by way of example, with reference to the accompanying drawings in which:

FIG. 1 is an explanatory diagram of the dynamic elements utilised in a motor cycle, FIG. 2 is a perspective view of a preferred construction of the frame of a motor cycle according to the invention, FIG. 2a is a view in perspective of a modification of FIG. 2, in which an intermediate solid is an enclosure instead of being a tetrahedron, FIG. 3 is a side view of an assembly comprising the steering column, frame, engine, and rear swinging arm of a motor cycle, the frame being as shown in FIG. 2, FIGS. 4 and 5 are similar views to FIGS. 2 and 3 and relate to a modified embodiment of the invention, and FIG. 6 is a diagrammatic view in perspective of another embodiment of the invention.

DESCRIPTION OF THE PREFERRED EMBODIMENTS

The dynamic elements of a motor cycle as shown diagrammatically in FIG. 1 are a front wheel 1 carried by a steering system 11 and a suspension 12, an engine block 2 suspended on the frame (not shown in FIG. 1), and a rear wheel 3 carried by a swinging arm 31'. These elements are represented relative to the plane of symmetry $\pi$ having a horizontal axis $A_{oy}$ and a vertical axis $A_{oz}$, in which $A_o$ is the point of contact with the ground of the front wheel.

The steering system 11 and the front wheel suspension 12 are carried by a steering column 13 which has a rake $\alpha$ and which serves as rotary connection between the mass of the front wheel assembly and the engine block, transmitting the reciprocal forces of the front wheel assembly, and the engine block. The centre of gravity of the engine block and the rider is at G, and the engine block constitutes a shock-absorbing element.

Similarly, the suspension connection 31 of the rear wheel constitutes a connection having a horizontal axis of rotation 33 by which the reciprocal forces of the engine block and rear wheel assembly are transmitted, this wheel bearing on the ground at $B_o$.

The dynamic elements which apply forces to the connection between the front wheel assembly and the engine, that is to say practically at the junction between the steering column 13 and the frame, will now be considered.

For the engine, these forces are its weight, the inertial tensor and the dynamic moment of the crankshaft. For the front wheel assembly, these forces are the mass of the front wheel assembly, its inertial tensor, and its dynamic moment which produces a gyroscopic effect.

The resultant forces of the whole machine produce a force on the front wheel, at its point of contact $A_o$ with the ground, which can be resolved into the transverse, horizontal, and vertical components $A_x$, $A_y$, and $A_z$ respectively. If the machine has good symmetry and if the rake is suitably selected, the components $A_x$ and $A_y$ will remain within acceptable limits. However, the component $A_x$ produces a considerable torsional force which known structures cannot withstand because of their excessive torsional flexibility, which results in vibrational resonance caused by the component $A_x$, which fluctuates because of the irregularity of the ground, and by the gyroscopic reaction of the front wheel 1 and also by the gyroscopic effect of the rotating part of the engine.

FIGS. 2 to 6 illustrate embodiments of the invention which eliminate the risk of torsion through resonance.

In FIGS. 2 and 3 the frame comprises rigid tubes which are welded together at the corners A, B, C, D of a tetrahedron which constitutes an intermediate solid and which is defined by the steering column 13, a horizontal cross-member 14 extending transversely opposite the steering column, and four connection tubes 15, 16, 17, 18 respectively joining the points A and D, A and C, B and D, B and C.

FIG. 2 illustrates more particularly a connection with no degree of freedom between a reference solid 2 (here a motor cycle engine) and a bar 13 (here the motor cycle steering column).

FIG. 3 shows that the engine 2 is rigidly fixed on a cradle 21 consisting of two parallel tubes 22 which support the engine laterally and ending in rear angle pieces 23.

The tetrahedron is extended on both sides by two tubes welded to form a triangle, these tubes being tubes 25 and 27 which extend from points A and D to a common point F, and tubes 26 and 28 which extend from points A and C to a common point E. The tubes 25 to 28 are so disposed that the apices E and F of the triangles ACE and ADF are below the cross-member 14 and are spaced apart from one another by a distance slightly less than the width of the engine.

Two other tubes 31 and 32 are respectively welded to the cross-member 14 at points D and C and extend towards the rear, where their ends H and G are respectively joined to one of the angle pieces 23 by a plate 24.

Instead of using two angle pieces 23, provision may be made for the two points G and H to coincide as shown in FIG. 2a, to support the engine at a single rear fastening point, so that the engine is then fixed by three points E, F, and G.

In this way the engine, or more accurately its cradle, which comes to the same thing, is fixed by the three or four points of attachment E, F, G, H, each of which is connected by tubes welded to one of the two ends C, D of the same side of the cross-member 14, and the points E and F are connected to the steering column 13 at A.

FIG. 2a shows a modification of the preferred embodiment of FIG. 2, in which the intermediate solid is no longer a tetrahedron but a welded sheet metal box 4. The steering column 13 is part of the construction of this box, since it is welded along the front edge of the box 4 and defines the two connection points A, B.

The box has a straight or curved rear edge 8 joining two connection points C and D. The box is apertured at 5 and 6, corresponding to neutral stress zones, so that the construction is as light as possible.

Furthermore, the two connection tubes 31 and 32 which extend respectively from the points D and C are joined together at a single rear point G connected to the engine, which is then rigidly fixed at three points E, F, G.

The preferred embodiment may be summarised by indicating that at least three points of connection for the engine, or of an engine cradle, which are not in alignment, are connected by at least four rigid connecting bars, each point being connected to at least one of the ends of the horizontal cross-member, while at least two bars lead to each lateral end and at least two of the engine connection points are connected by two other bars to the steering column in the immediate proximity of one of the corners to the intermediate solid.

In FIGS. 4 and 5 the same reference numerals are adopted for the same parts. The tetrahedron A, B, C, D defined by the column 13, the cross-member 14, and the tubes 15, 16, 17, 18 is present. The engine 2 is suspended on the frame by four symmetrical points 29 disposed two by two on the right and left and at the front and rear of the engine. The two points 29 on the right are at the ends of tubes 32, 34, which are both welded by their other ends to the corner junction C of the tetrahedron, while the two points 29 on the left are at the ends of tubes 31 and 33, both of which are mounted at their other ends by swivel joints on the corner D of the tetrahedron. Five tubes 41, 42, 43, 44, 45 constitute a pyramid having an apex J. The tube 41 as top tube of the frame is welded at B, and the tubes 42, 43, 44, 45 are welded respectively, at their ends remote from the apex J, to the two rear points 29 and to the two points C and D of the cross-member 14. Optionally a tube 46 may reinforce the triangulation between the tubes 32 at the front of the frame, between the corner D and the tube 32.

As in the embodiment of FIG. 3, it is possible for the two rear fastening points 29 of the engine to coincide as a single axial point.

FIG. 6 shows a modified embodiment in which the engine is suspended by only two points 35 and 36 at the front and rear, these points lying in the plane of symmetry and being in alignment with the centre of gravity G of the engine 2, and substantially in alignment with the point of contact $A_o$ of the front wheel with the ground.

The point 35 is connected by welded tubes 51 and 52 to the two points C and D at the end of the cross-member 14. The point 36 is similarly connected by welded tubes 53 and 54 to the two points C and D. Another tube 41 connects the point 36 to the upper end B of the steering column.

In practice the cross-member 14 or the edge 8 is of sufficient length to impart adequate rigidity to the isostatic structures formed. It has been found that for convenience and reliability the length of the cross-member may be substantially equal to the minimum overall space required for the knees of the rider.

Consequently, sufficient space is available at the rear of and above the engine to accommodate a fuel tank whose height is equal to its length, thus eliminating the disadvantage of known motor cycles in which the tank is elongated on the frame, which gives rise to movements of liquid which are harmful to stability.

Other important advantages of the invention, are the direct access to the cylinder head of the engine without dismantling, the lowering of the centre of gravity, and access for all carburettor and sparking plug adjustments.

In the detailed description above no mention has been made of the rear wheel and of its suspension, which are outside the scope of the invention. They are of known types or of a new type, for example of the type described in a co-pending patent application.

I claim:

1. A motorcycle having an engine block and steering column, in which the engine block is joined to the steering column by an intermediate solid which extends rigidly from two connection points on the steering column, and comprises two other connection points disposed on a cross-member at a distance from the steering column, and wherein the engine block and the intermediate solid are joined to one another by a structure of at least six connecting bars whose junctions are at least three connection points of the intermediate solid and at least three connection points of the engine block not in straight line alignment with each other, two of said three points of the block each being connected to at least two connection points of the intermediate solid and two of said three points of the block being longitudinally spaced from each other.

2. A motor cycle according to claim 1, wherein the length of the cross-member is substantially equal to the minimum overall space required for the knees of the rider in closed contact with the motor cycle.

3. A motorcycle according to claim 1, wherein at least three connection points of the engine, which are not in alignment with one another, are connected by at least four rigid connecting bars, each of these bars being connected to at least one of the connection points of the cross-member, while at least two bars connect to each lateral connection point, and at least two points are connected by two other bars to the steering column in the immediate proximity of one of the connection points of the intermediate solid.

4. A motorcycle according to claim 1, wherein at least three connection points of the engine block which arenot in alignment with one another, are connected by at least four rigid connecting bars, each to at least one of the ends of the horizontal cross-member, at least two bars leading to each lateral connection point, while at least four bars are joined in a bundle having a common point constituting a connection point.

5. A motor cycle according to claim 1, in which the engine block comprises a cradle on which the engine is rigidly fixed.

6. A motor cycle according to claim 1, wherein the assembly comprising the steering column, the engine block and the structure of connecting bars is an isostatic structure.

* * * * *